(12) United States Patent
Hill (10) Patent No.: US 11,712,657 B2
(45) Date of Patent: Aug. 1, 2023

(54) ISOLATED PLASMA TUBE TREATMENT SYSTEMS

(71) Applicant: ThrivalTech, LLC, Lafayette, CO (US)

(72) Inventor: Garrett Hill, Boulder, CO (US)

(73) Assignee: THRIVALTECH, LLC, Ashland, OR (US)

( * ) Notice: Subject to any disclaimer, the term of this patent is extended or adjusted under 35 U.S.C. 154(b) by 0 days.

(21) Appl. No.: 17/314,973

(22) Filed: May 7, 2021

(65) Prior Publication Data

US 2021/0260523 A1   Aug. 26, 2021

Related U.S. Application Data

(63) Continuation of application No. 16/752,864, filed on Jan. 27, 2020, now Pat. No. 11,000,802, which is a continuation of application No. 16/164,605, filed on Oct. 18, 2018, now Pat. No. 10,543,457.

(60) Provisional application No. 62/573,950, filed on Oct. 18, 2017.

(51) Int. Cl.
*B01D 53/32* (2006.01)
*F01N 3/08* (2006.01)
*B01D 53/94* (2006.01)
*F01N 3/05* (2006.01)
*H05H 1/24* (2006.01)

(52) U.S. Cl.
CPC ........... *B01D 53/326* (2013.01); *B01D 53/32* (2013.01); *B01D 53/9459* (2013.01); *F01N 3/05* (2013.01); *F01N 3/0892* (2013.01); *H05H 1/2439* (2021.05); *B01D 2257/404* (2013.01); *B01D 2258/01* (2013.01); *B01D 2258/012* (2013.01); *B01D 2259/818* (2013.01); *F01N 2240/28* (2013.01); *F01N 2470/24* (2013.01); *H05H 1/2418* (2021.05); *H05H 1/2437* (2021.05); *H05H 1/2443* (2021.05); *H05H 2245/17* (2021.05)

(58) Field of Classification Search
CPC .. B01D 53/326; B01D 53/32; B01D 53/9459; B01D 2259/818; F01N 3/0892; F01N 2240/28; H05H 1/2406; H05H 1/2418; H05H 1/2443
USPC ........................................ 422/196.07, 186.02
See application file for complete search history.

(56) References Cited

U.S. PATENT DOCUMENTS

| 5,518,698 | A | 5/1996 | Karlson et al. |
| 5,827,407 | A | 10/1998 | Wang et al. |
| 8,794,574 | B2 | 8/2014 | Lang |
| 2002/0153241 | A1 | 10/2002 | Niv et al. |
| 2005/0126159 | A1 | 6/2005 | Cho et al. |

(Continued)

*Primary Examiner* — Tom P Duong
(74) *Attorney, Agent, or Firm* — Fish IP Law, LLP (57) ABSTRACT

Systems, methods, and apparatus are contemplated in which a tube cell that produces a dielectric barrier discharge (DBD) is individually configured to minimize the mixing of unwanted byproducts of the generated plasma with an exhaust air stream. The tube cell generates a DBD within a tube cell, such that oxidants or radicals are generated in an environment substantially separated from the exhaust stream. The generated oxidants are directed to intersect with the exhaust stream to minimize the generation of unwanted byproducts. The tube cells are further shaped and arranged in tube cell arrays to alter the flow dynamics of the exhaust stream and the oxidant or radical streams, including mixing of the streams.

16 Claims, 12 Drawing Sheets

(56) References Cited

U.S. PATENT DOCUMENTS

2011/0048251 A1   3/2011   Berdenshtein et al.

ISOLATED PLASMA TUBE TREATMENT SYSTEMS

This application claims the benefit of priority to and is a continuation of U.S. patent application Ser. No. 16/752,864, filed on Jan. 27, 2020, which claims the benefit of priority to and is a continuation of U.S. patent application Ser. No. 16/164,605, filed on Oct. 18, 2018, which claims the benefit of priority to U.S. provisional application No. 62/573,950 filed on Oct. 18, 2017. These and all other extrinsic references referenced herein are incorporated by reference in their entirety.

FIELD OF THE INVENTION

The field of the invention is exhaust treatment systems.

BACKGROUND

The background description includes information that may be useful in understanding the present invention. It is not an admission that any of the information provided herein is prior art or relevant to the presently claimed invention, or that any publication specifically or implicitly referenced is prior art.

Industry standards for engine emissions require engine pollutants to be minimized below a threshold level. While many catalysts can be introduced to engine exhaust streams to render pollutants inert or to otherwise nullify the effects of engine pollutants, such catalysts cannot operate at all engine temperatures. For example, see US Patent Publications 2011/0048251 and US2002/0153241, as well as U.S. Pat. Nos. 5,518,698 and 8,794,574. Further, known methods suffer from generation of unwanted by products (e.g., $HNO_2$, $HNO_3$) by creating OH radical from hydrogen rich gas streams, when then reacts with NO and $NO_2$ to form $HNO_2$ and $HNO_3$, respectively.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is a need for a system and method to efficiently introduce catalysts to exhaust streams at lower temperatures.

SUMMARY OF THE INVENTION

The inventive subject matter contemplates apparatus, systems, and methods for treating an exhaust stream. A tube cell has an oxidizing flow path for an air stream (e.g., raw air, humid air, filtered air, air doped with catalysts, etc) to flow through the tube out a plurality of air outlets. An inner electrode of the tube cell extends through a length of the tube cell, and a dielectric layer insulates the inner electrode from the flow path. An outer electrode directs the flow path to the plurality of air outlets, which are formed in a shell of the outer electrode. A power generator is coupled to the inner electrode and the outer electrode and used to generate a dielectric barrier discharge in the flow path to oxidize the air stream. An exhaust stream flows around the exterior of the tube cell and intersects with air exiting the plurality of air outlets (outlet air).

In some embodiments, the tube cell has an array of substantially identical tube cells. The exhaust air flow path flows around the array of substantially identical tube cells and intersects with outlet air from the air outlets on the array of substantially identical tube cells. The array of substantially identical tube cells can include a plurality of rows of tube cells, or tube cells in a plurality of rows. In some embodiments, each neighboring row of tube cells is offset from one another along the exhaust air flow path. Optionally, each neighboring row of tube cells is offset by at least a square 90° configuration, a square 45° configuration, a triangle 30° configuration, or a triangle 45° configuration. The distance between each tube cell in the array of substantially identical tube cells is preferably optimized to maximize the immediate mixing of the outlet air and the exhaust air, the distance can also be optimized to minimize the immediate mixing of the outlet air and the exhaust air. In preferred embodiments, the distance between at least 3 tube cells of the rows of tube cells conforms to the golden mean (i.e., phi ratio, $$\frac{a+b}{a} = \frac{a}{b} \stackrel{def}{=} \varphi, \text{ or } \varphi = \frac{1+\sqrt{5}}{2},$$

abbreviated as 1.618).

The array of substantially identical tube cells is preferably disposed orthogonally to a flow of the exhaust stream, but arrays disposed at an angle (e.g., obtuse, acute, etc) to a flow of the exhaust stream are also contemplated. Generally, the outer electrode has a cross-sectional area or shape of a circle, a tear drop, a diamond, or a curved tear drop. Preferably at least 3 features of the cross-sectional area conform to the golden mean. The cross-sectional area of the outer electrode can also be twisted along a length of the outer electrode to form a spiral, preferably with at least 3 features of the spiral conforming to the golden mean along a length of the tube cell.

In some embodiments an outer surface of the outer electrode has micro-surface features that accelerate the outlet air flowing around the outer surface of the outer electrode, though micro-surface features that decelerate the outlet air flowing around the outer surface of the outer electrode are also contemplated. In preferred embodiments, the cross-sectional shape and micro-surface features of the outer surface of the outer electrode is altered to maximize the immediate mixing of the outlet air and the exhaust air, but the cross-sectional shape and micro-surface features can also be altered to minimize the immediate mixing of the outlet air and the exhaust air.

Some embodiments further include an electrode placed downstream (i.e., a downstream electrode) from both the outlet air and the exhaust air, such that a voltage is applied to the downstream electrode to entrain gas flow from the tube cell to the downstream electrode. Power to the downstream electrode can be pulsed to alter a speed of air flowing towards the downstream electrode.

It should be appreciated that the inventive subject matter uses an array of tubes that are placed inside an exhaust stream (e.g., diesel engine exhaust stream, etc), which generate a plasma within them using a (preferably) dry air source that is injected into the tubes from outside the exhaust stream (e.g., via air pump, turbo, blower, etc). The exhaust stream is shielded from the plasma and therefore few (preferably no) unwanted byproducts (e.g., $HNO_2$, $HNO_3$, etc) are created as there is little (preferably no) source of hydrogen to create OH radicals. Oxidants are further injected into a radical jet stream near the face of the catalyst/particulate filter (or similar filters) in an exhaust system (e.g., diesel engine exhaust system). It is contemplated that hybrid plasmas can be used to generate oxidants or radicals. For example, a blown arc creates NO, which is then oxidized by oxygen radicals generated by a Dielectric Barrier discharge (DBD) placed downstream of the blown arc. Various tube geometries, surface patterns, and tube arrangements are contemplated to modify drag and mixing characteristics in the radical stream, exhaust stream, and mixture streams. It is further contemplated that high voltage electric fields are utilized to entrain stream flow (e.g., mixture stream, etc).

The following description includes information that may be useful in understanding the present invention. It is not an admission that any of the information provided herein is prior art or relevant to the presently claimed invention, or that any publication specifically or implicitly referenced is prior art.

Various objects, features, aspects and advantages of the inventive subject matter will become more apparent from the following detailed description of preferred embodiments, along with the accompanying drawing figures in which like numerals represent like components.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

DETAILED DESCRIPTION

The inventive subject matter provides apparatus, systems, and methods in which a tube cell that produces a dielectric barrier discharge to oxidize an air stream can be configured to minimize the mixing of unwanted byproducts of the generated plasma with an exhaust air stream. The system generates a dielectric barrier discharge within a tube cell to generate oxidants in an environment isolated from the exhaust stream, and directs the generated oxidants to intersect with the exhaust stream to minimize the generation of unwanted byproducts.

The system generally has a power generator coupled to an inner electrode and an outer electrode with a dielectric layer sandwiched between both electrodes. The power generator sends power to the electrodes, generating a dielectric barrier discharge (DBD) plasma within the one or more tube cells. DBDs contemplated in the inventive subject matter are filamentary or glow type plasmas having a non-equilibrium state between the temperatures of the electrons and the ions/gas/neutrals. An air stream flows down a length of the dielectric layer within each tube cell, which allows the DBD plasma to oxidize the raw stream, which exits the tube cell as an oxidized outlet stream via one or more air outlets of the tube cell. While the air stream is preferably raw (e.g., drawn from local environment), it is contemplated that such are stream can be treated (e.g., remove water vapor, heat, cool, ionize, dope with catalyst, enriched with N, O, H, syngas, noble gases, etc). By shielding the oxidation area from the exhaust stream, the generation of unwanted byproducts is minimized, and plasmas can be generated with lower voltages and temperatures. Utilizing different geometries, surface features, and arrayed tube configurations, the system could target, with specificity, where the outlet air from each tube bell intersects the exhaust stream. Such geometries, surface features, and arrayed tube configurations are illustrated with specificity in the attached claims and figures.

The system could be tiered, where a raw stream that flows through a first plasma (e.g. a glide arc plasma) then is entrained or otherwise guided to flow through the DBD plasma in the arrayed tube cells. Glide arc plasmas are arc plasma discharges that are in a quasi non-equilibrium state between the temperatures of the electrons and the ions/gas/neutrals. This provides both equilibrium and non-equilibrium plasmas in the same transient environment. Such plasmas facilitate conditions for catalytic light off at far lower temperature than most oxidation catalysts, which reduces the requisite temperature for oxidation. For example, an air stream at room temperature could be introduced into a glide arc plasma generator to generate NO, which is then introduced into the DBD plasma via one or more tubes of the tube array, oxidizing NO into NO2 also at room temperature.

Figure 19:
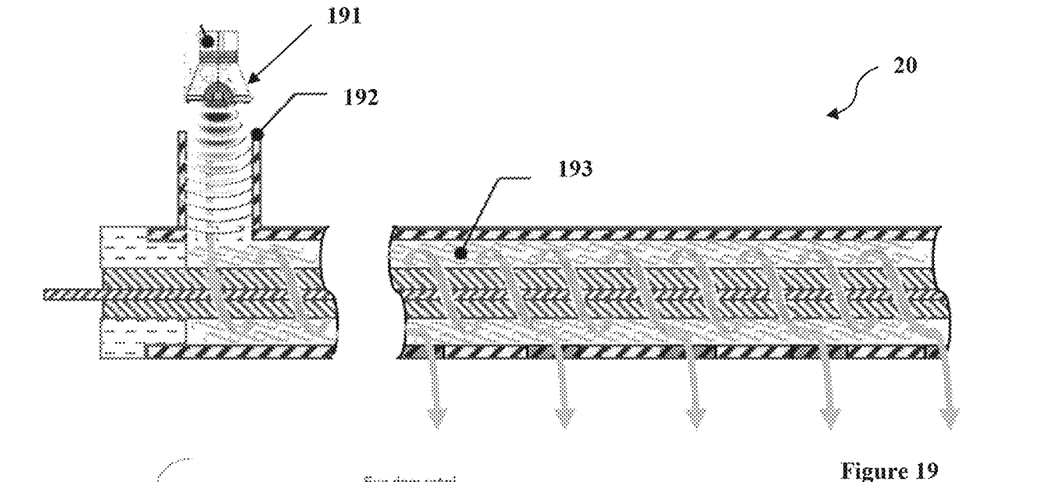
FIG. 19 depicts yet another single tube cell of the inventive subject matter.

Waves, such as vibrational, electric, radio, light, or ultrasonic waves could be introduced to some or all of the tubes to enhance mixing and modify the energy states of the raw stream with the DBD plasma. In some embodiments, the ultrasonic waves could be aimed at a tube inlet, as shown in FIG. 19. In other embodiments, the ultrasonic waves could be aimed generally at a group of arrayed tube cells. Using ultrasonic waves at a harmonic of the plasma drive frequency could amplify the resonant coupling effect, increasing the intensity of microvorticies generated within the flow path of a tube cell.

Figure 1:
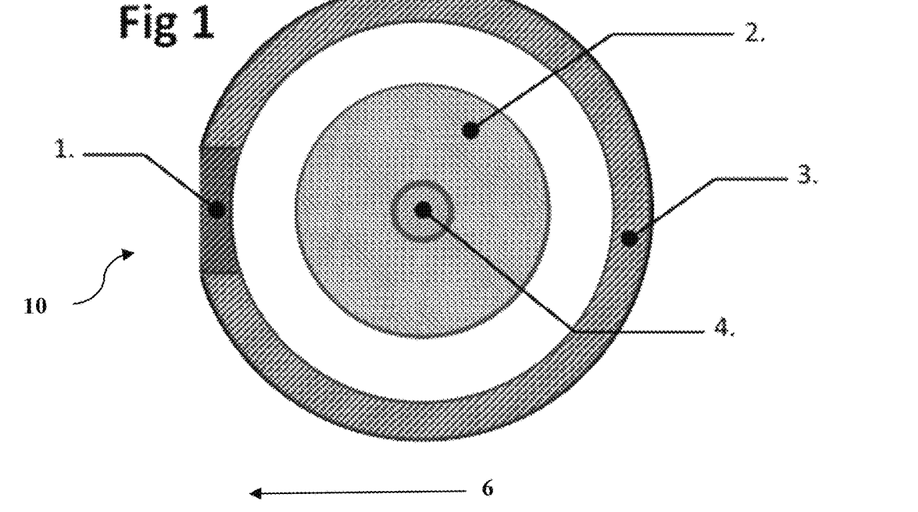
FIG. 1 depicts a cross section view of an electrode of the inventive subject matter.

FIG. 1 depicts a cross section of single tube cell 10, which has outer electrode outlet 1, dielectric electrode layer 2, outer electrode 3, and inner electrode 4. Dielectric electrode layer 2 is made of a dielectric material (e.g., quartz, ceramic, mica, etc). Outer electrode 3 is made of conductive material, (e.g., Stainless Steel, Nickel, etc). Inner electrode 4 is also made of conductive material (e.g., Stainless Steel, Nickel, Titanium, Copper, Aluminum, etc). Inner electrode 4 can have a diameter of 0.05 inches, while outer electrode outlet 1 can have a diameter of 0.125 inches. Dielectric electrode layer 2 preferably has a diameter of 0.2 inches. Outer electrode 3 has a wall thickness of 0.05 inches and an inner diameter of 0.04 inches. Exhaust flows in the direction depicted by arrow 6. An oxidant injection area is on the left portion of tube cell 10, as to not allow for exhaust gas to enter tube cell 10.

Figure 2:
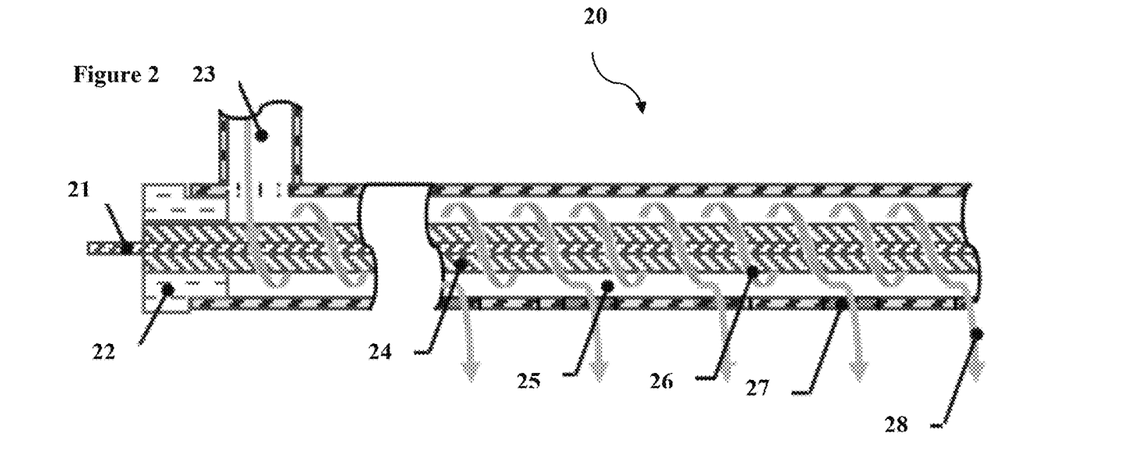
FIG. 2 depicts a cross section view of a single tube cell of the inventive subject matter.

FIG. 2 depicts DBD tube 20, having inner electrode 21, standoff/insulator 22, Tube inlet 23, dielectric electrode layer (e.g., insulator) 24, DBD plasma zone 25, swirl flow dynamic 26 within DBD Plasma Zone 25, tube outlet orifices 27, and oxidants 28 exiting DBD tube 20.

Figure 3A:
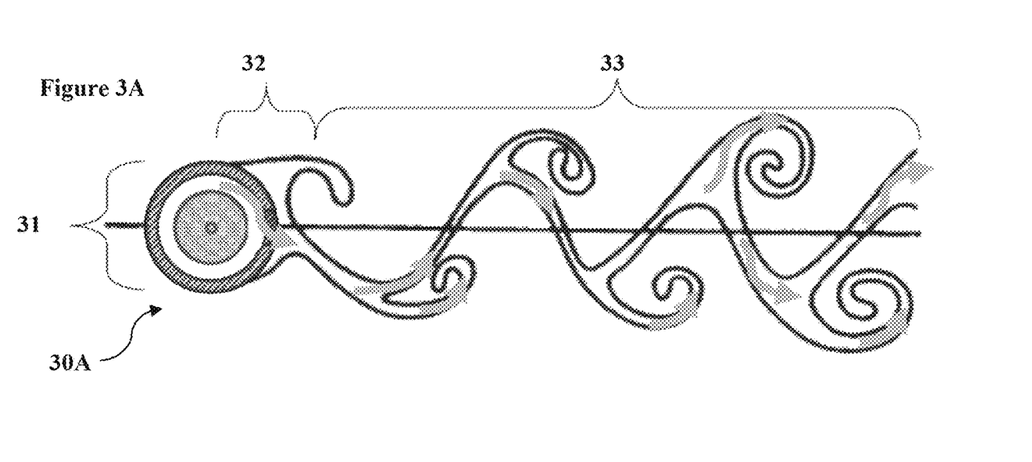
FIG. 3A depicts flow dynamics of an electrode of the inventive subject matter.
Figure 3B:
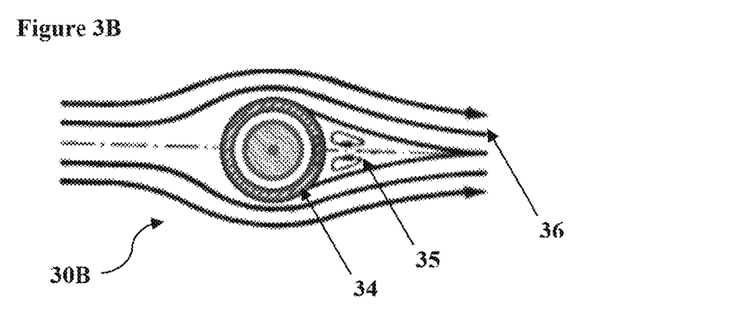
FIG. 3B additional flow dynamics of an electrode of the inventive subject matter.
Figure 3C:
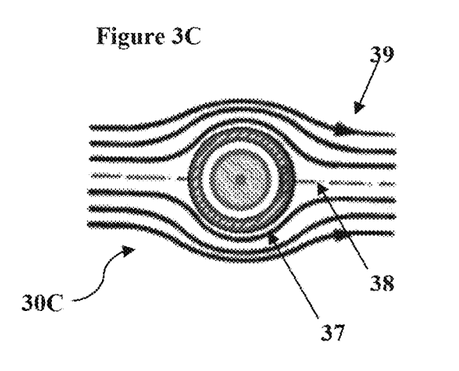
FIG. 3C depicts further flow dynamics of an electrode of the inventive subject matter.

FIGS. 3A-3B depict flow dynamics 30A, 30B, and 30C. 30A has frontal region 31 which faces the flow, separation point 32, wake region 33. 30A provides increased drag and asymmetric mixing dynamics for a flow. 30B has reduced drag and symmetric mixing dynamics for a flow. 30C has symmetrical mixing dynamics for a flow.

Figure 4:
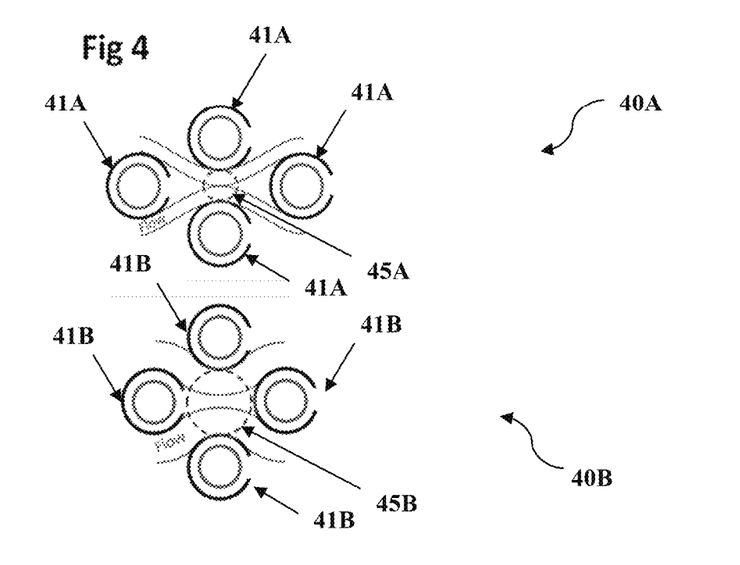
FIG. 4 depicts cross section views of arrays of tube cells of the inventive subject matter.

FIG. 4 depicts tube cell arrays 40A and 40B comprising tube cells 41A and 41B, respectively. Tube cross sectional flow area are identified at regions 45A and 45B, and can determine flow characteristics (backpressure, flow velocity, dynamic geometry, vortex shedding frequency) on gas flow both inside and outside the tubes.

Figure 5:
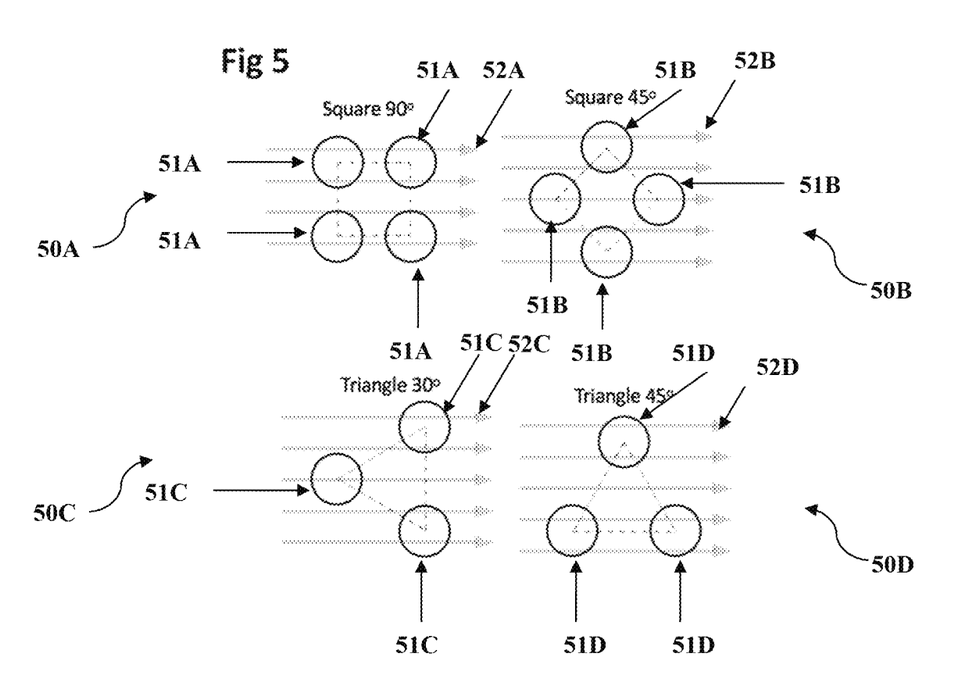
FIG. 5 depicts more cross section views of additional arrays of tube cells of the inventive subject matter.

FIG. 5 depicts tube cell arrays 50A, 50B, 50C, and 50D, having tubes 51A, 51B, 51C, and 51D in various orientations. For example, array 50A has tubes arranged in a square 90° with respect to flow direction 52A, while array 50B has tubes arranged in a square 45° with respect to flow direction 52B. Array 51C has tubes arranged in a triangle 30° to flow direction 52C, while array 51D has tubes arranged in a triangle 45° to flow direction 52D. Tube array configurations can either enhance or diminish mixing and drag depending on the tubes' correlating positions with respect to their neighboring tubes.

Figure 6:
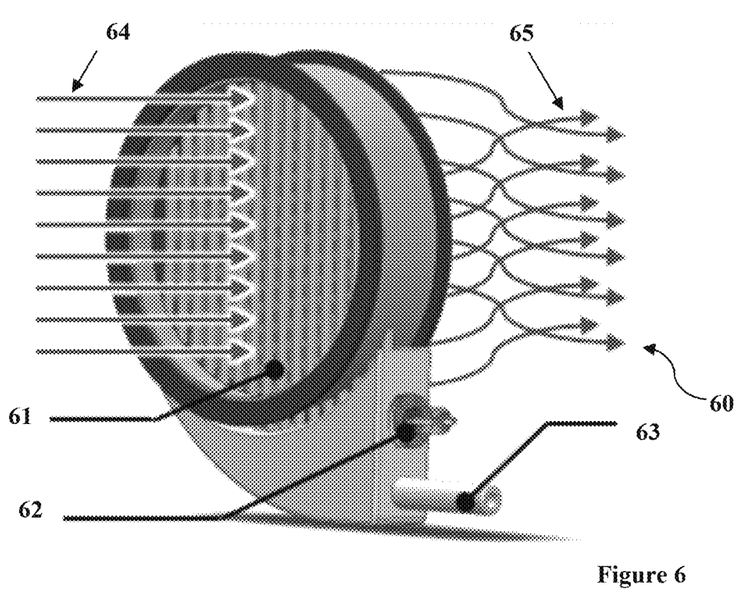
FIG. 6 depicts a dielectric barrier discharge (DBD) tube array of the inventive subject matter.

FIG. 6 depicts DBD tube array 60 having tubes 61, electrical feedthrough 62, inlet 63, inlet cross-flow 64, and outlet mixed flow 65. Electrical feedthrough 62 is an electrode that includes an insulator and mounting mechanism.

Figure 7:
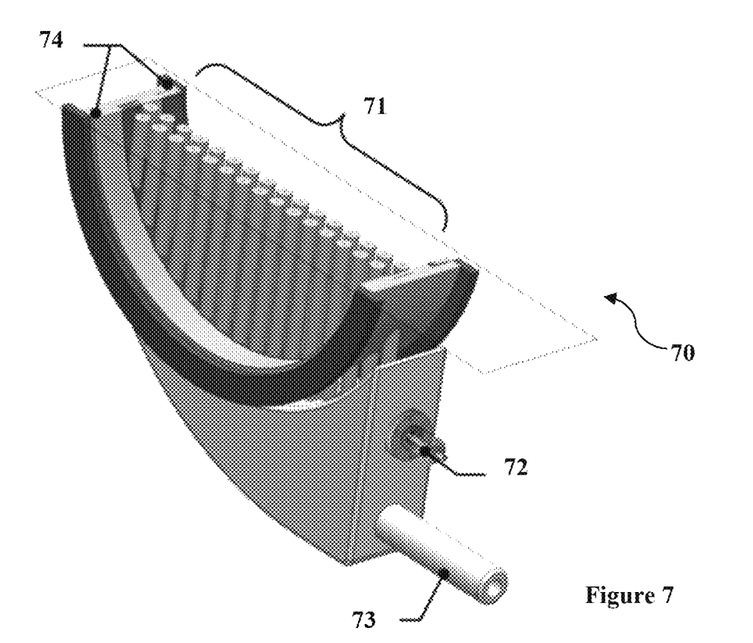
FIG. 7 depicts a cross section view of a dielectric barrier discharge (DBD) tube array of the inventive subject matter.

FIG. 7 depicts a cross section of DBD tube array 70, having tube array 71, electrical feedthrough 72, feedstock inlet 73, and flanges 74.

Figure 8:
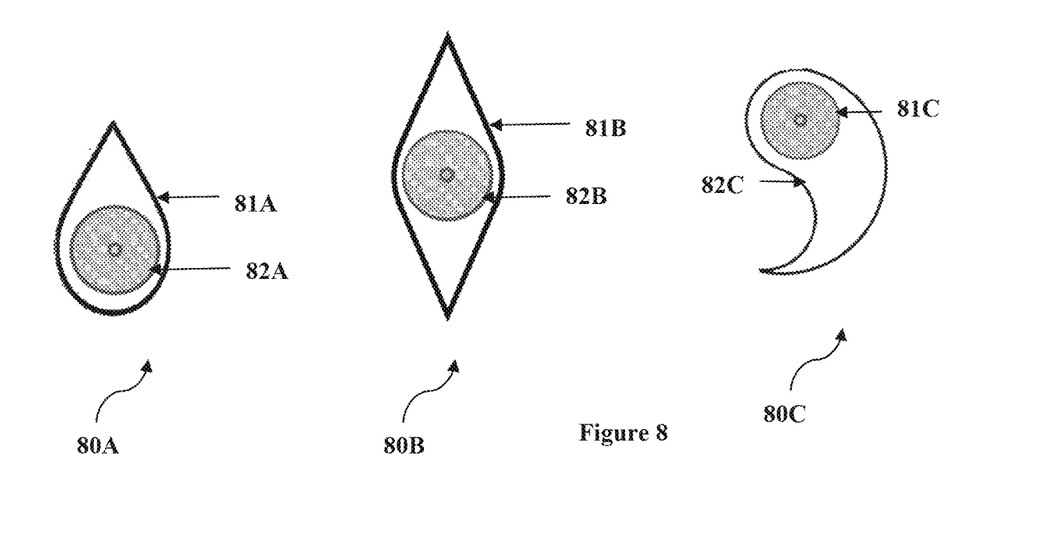
FIG. 8 depicts cross section views of single tube cells of the inventive subject matter.

FIG. 8 depicts single tube cell cross section geometries 80A, 80B, and 80C. In 80A, the tube cell has the cross section of a tear drop, while 80C has the cross section of a curved tear drop. 80B has the cross section of a diamond. It should be appreciated that DBD arrays of the inventive subject matter preferably include tubes of the same cross section shape, but arrays with tubes having different cross sections (e.g., cross sections that complement the shape of adjacent tubes, etc) are also contemplated.

Figure 9:
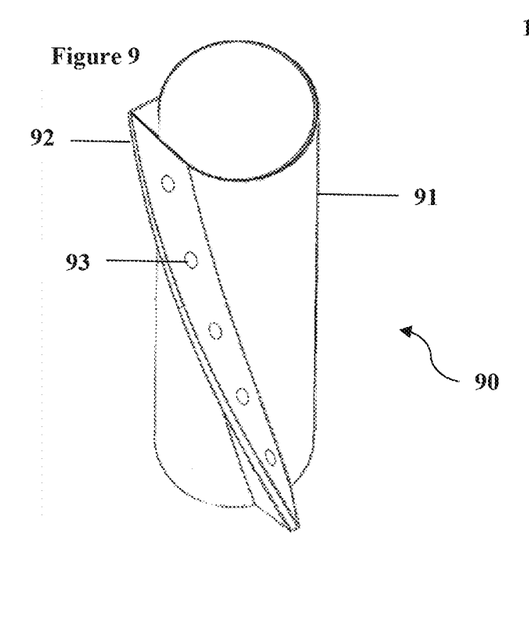
FIG. 9 depicts a single tube sell of the inventive subject matter.

FIG. 9 depicts helical tube surface 90, with tube 91, helical member 92, and oxidant injection point 93.

Figure 10:
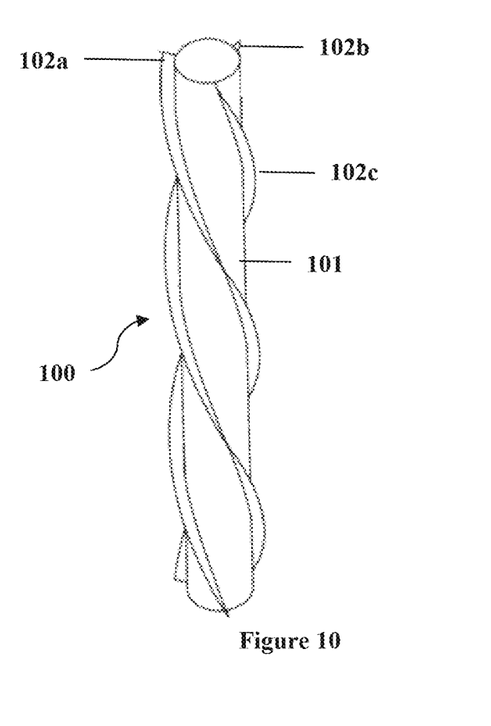
FIG. 10 depicts another single tube sell of the inventive subject matter.

FIG. 10 depicts helical tube surface 100, with tube 101, and helical members 102a, 102b, and 102c. It is also contemplated that tube surfaces of the inventive subject matter have tow helical members, or four or more. It is contemplated that DBD arrays of the inventive subject matter include one or more tubes having a helical surface as depicted in FIG. 9 or ten. In some embodiments, most or all tubes in the array have helical tube surface 90, but it is contemplated that most or all of the tubes alternatively have the shape of helical tube surface 100. In some embodiments, a DBD array comprises at least one tube having the shape of helical tube surface 90, and at least on tube having the shape of helical tube surface 100.

Figure 11:
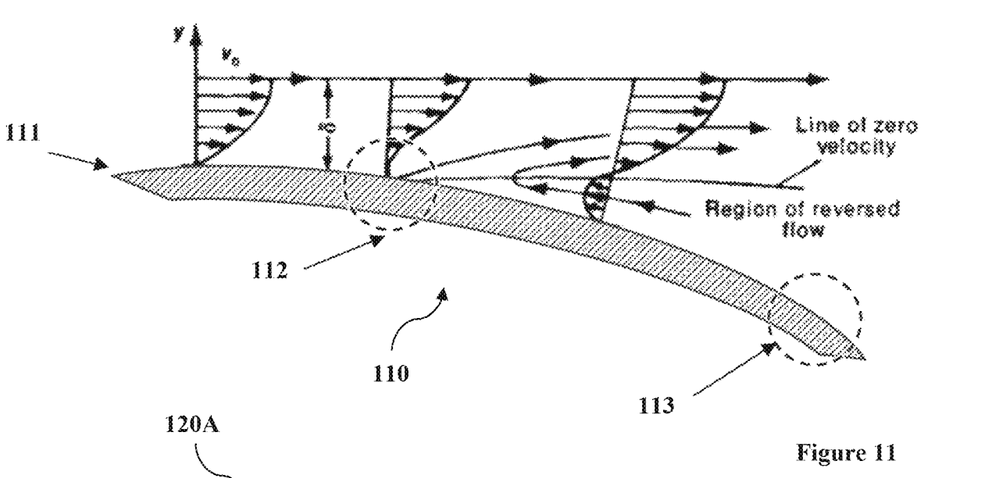
FIG. 11 depicts a cross section of the flow trajectories with respect to the separation point of the flow instabilities over the outer surface of the tube cell.

FIG. 11 depicts coherent micro surface 110, with tube surface 111, a separation point without coherent surface feature at section 112, and a separation point with coherent micro-surface features at section 113. Coherent micro-surface features size range from 0.2-10 mm (for length, width, and height), but can be less than 0.2 mm (e.g., 0.15 mm, 0.1 mm, 0.05 mm, 0.01 mm) and more than 10 mm (e.g., 11.02 mm, 11.04 mm, 11.06 mm, 11.08 mm, more than 12 mm, more than 15 mm, etc). Coherent micro-surface features are typically spaced from 0.001 mm to 10 mm from at least one (preferably most, more preferably all) neighboring features, but can also be placed more than 10 mm from neighboring features (e.g., 11.02 mm, 11.04 mm, 11.06 mm, 11.08 mm, more than 12 mm, more than 15 mm, etc). Coherent patterns of micro-surface features on the surface of the tubes induce a Coanda Effect (e.g., entrained flow that attaches to a surface within the flow), which entrains and allows the gases to attach to the tube surface for a longer period of time before it separates. This extends the separation point into the oxidant injection zone, which can induce better mixing between the oxidants and the gas stream.

Figure 12:
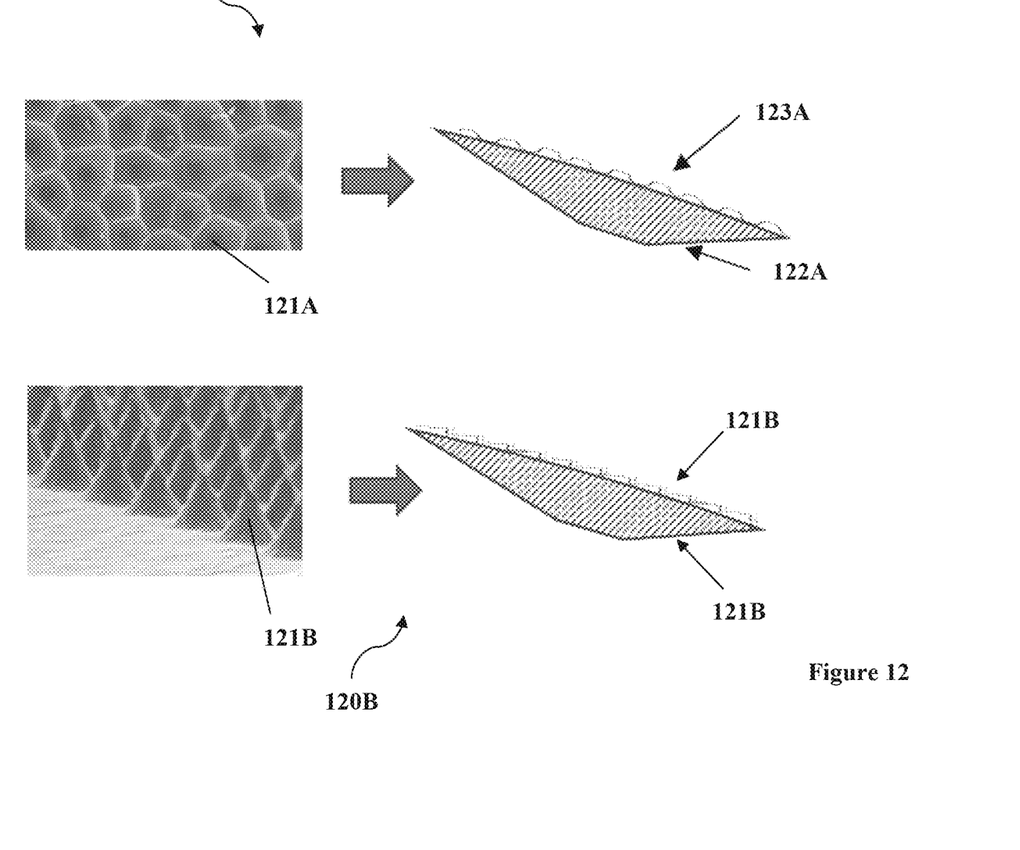
FIG. 12 depicts additional coherent micro-surface features of the inventive subject matter.

FIG. 12 depicts tube sections 120A and 120B with coherent micro-surface features. Tube section 120A has coherent micro-surface features 121A and 123A along tube surface 122A that accelerate flow. It should be noted that features 121A and 123A have a rounded structure, and provide a more streamlined interface for flow in the tube. Tube section 120B has coherent micro-surface features 121B and 123B along tube surface 122B that resist flow. Compared to features 121A and 123A, features 121B and 123B are more obstructive to flow in the tube.

Figure 13:
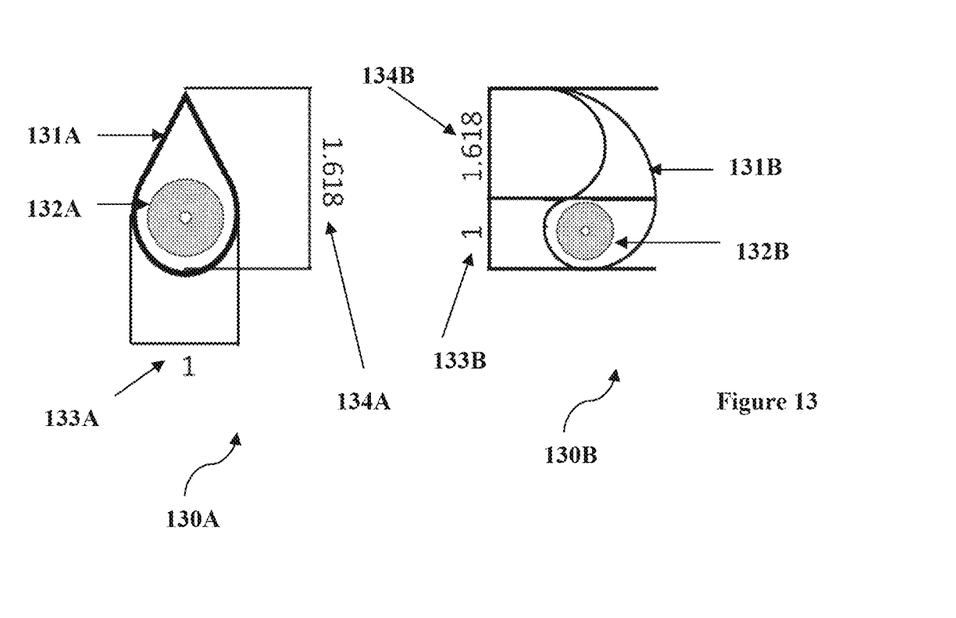
FIG. 13 depicts cross section views of single tube cells of the inventive subject matter.

FIG. 13 depicts single tube cell geometries 130A and 130B. The geometries of 130A and 130B both conform to the golden ratio (i.e., phi ratio). For example, the dimension (e.g., width) of 130A at region 133A is a single unit, while the dimension (e.g., width) at region 134A is 1.618 units, such that the ratio of dimensions at region 133A to 134A is 1.618 (133A:134A=1.618:1). Similarly, the dimension (e.g., width) of 130B at region 133B is a single unit, while the dimension (e.g., width) at region 134B is 1.618 units, such that the ratio of dimensions at region 133B to 134B is 1.618 (133B:134B=1.618:1). It should be appreciated that further geometries are contemplated by the inventive subject matter, such that dimensions, shapes, or orientations of the geometries have elements that conform with the golden ratio.

Figure 14:
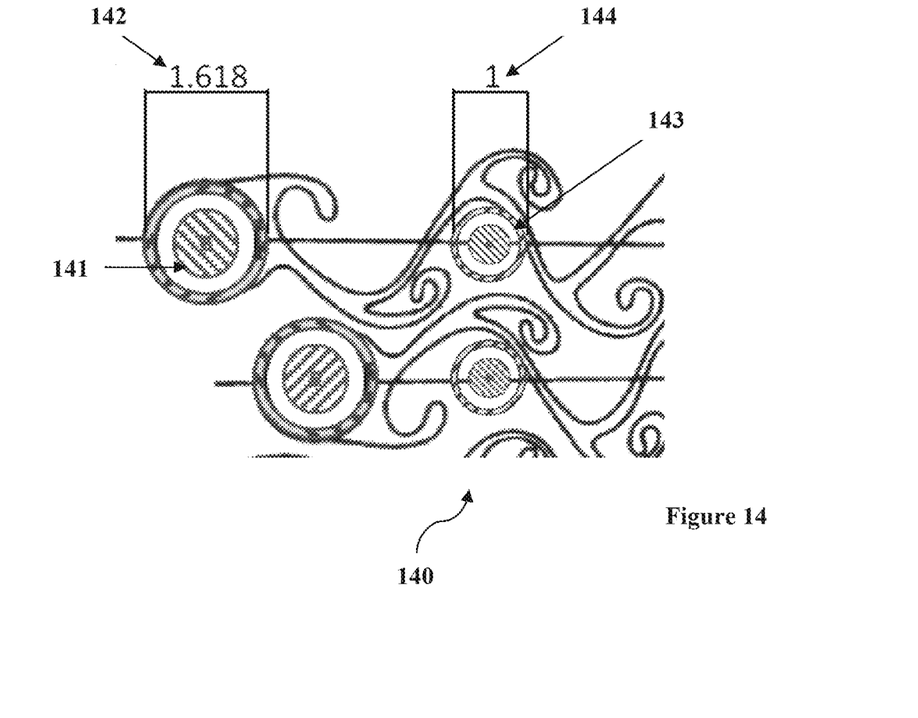
FIG. 14 depicts yet another array of single tube cells of the inventive subject matter.

FIG. 14 depicts single tube array 140. Tube array 140 has tube cells are sized according the golden ratio to complement the natural state of the karman Vortex Street instability, which sheds consecutive counter rotating vortices that correspond to the golden ratio with respect to their Strouhal Number. For example, tube 143 has a dimension (e.g., outer width) at region 144 that is 1 unit, while tube 141 has a dimension (e.g., outer width) at region 142 that is 1.618 units, such that the ratio of 142 to 141 is 1.618 (142:141=1.618:1).

Figure 15:
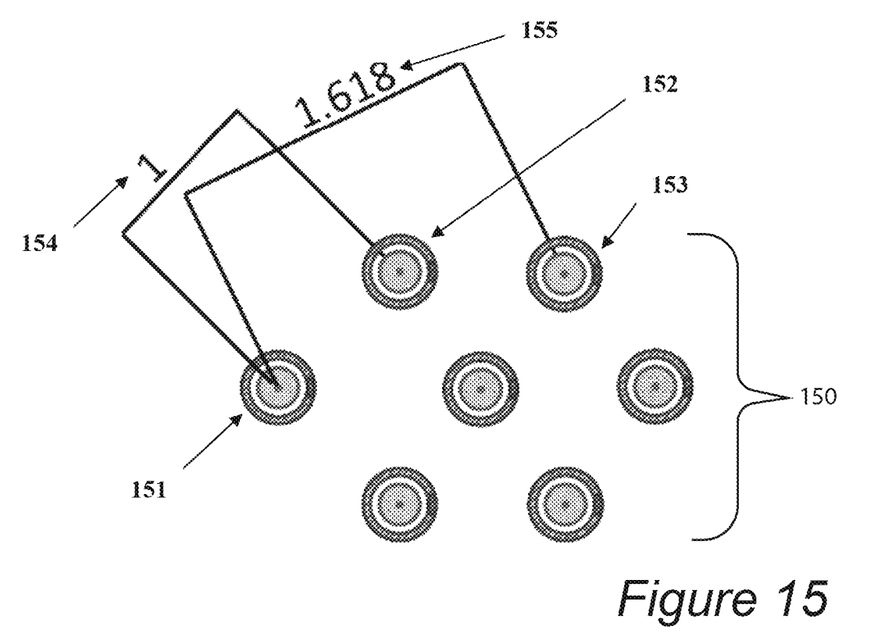
FIG. 15 depicts another array of single tube cells of the inventive subject matter.

FIG. 15 depicts single tube array 150 having elements that conform to the golden ratio. Examining tubes 151, 152, and 153, the center point of tube 151 is spaced one unit (see arrow 154) from the center point of tube 152. Likewise, tube 151 is spaced 1.618 units (see arrow 155) from the center point of tube 153. Tube array 150 conforms with the golden ratio as the ratio of spacing between center points of tubes 151 and 153 to the spacing between center points of tubes 151 and 152 is 1.618 (155:154=1.618:1).

Figure 16:
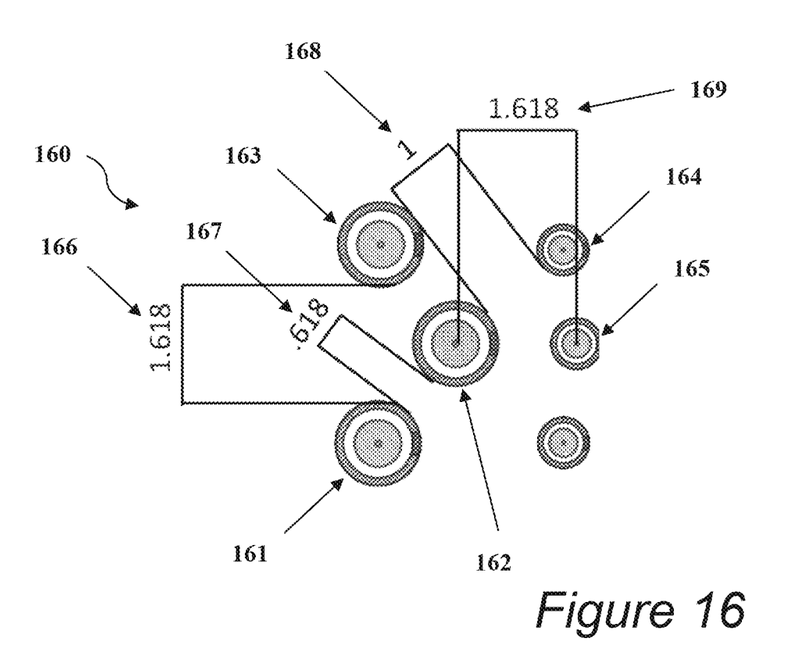
FIG. 16 depicts yet another array of single tube cells of the inventive subject matter.

FIG. 16 depicts single tube array 160 having additional elements that conform to the golden ratio. For example, the spacing between an outer wall of tube 161 to the outer wall of tube 162 is 0.618 units, while the spacing between the outer wall of tube 162 and the outer wall of tube 164 is one unit. Thus, the ratio of dimensions between tubes 162 and 164 to the dimensions between tubes 161 and 162 is 1.618 (arrow 168: arrow 167=1:0.618). Likewise, the the ratio of the spacing between outer walls of tubes 161 and 163 to the spacing between outer walls of tubes 162 to 164 is 1.618 (arrow 166: arrow 168=1.618:1), as is the ratio of the spacing between centers of tubes 162 and 165 to the spacing between outer walls of tubes 162 and 164 (arrow 169: arrow 168=1.618:1).

Figure 17:
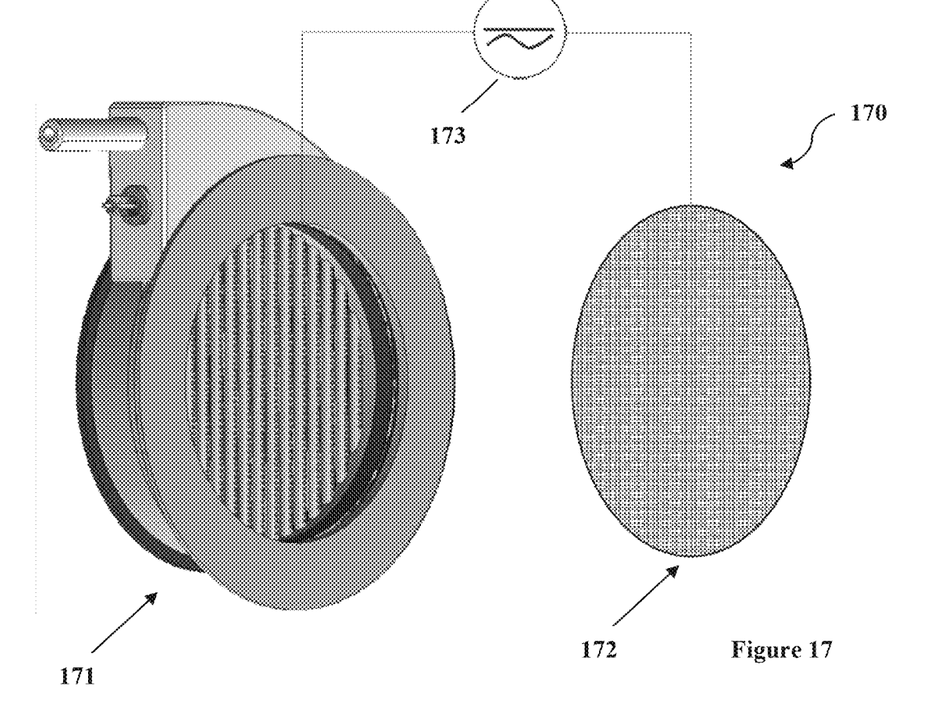
FIG. 17 depicts an assembly of a DBD array and a downstream electrode of the inventive subject matter.

FIG. 17 depicts assembly 170 of DBD array 171 electrically coupled to downstream electrode 172. High voltage AC and/or DC is applied between the tube surface and a downstream electrode can entrain the gas flow to become more coherent. This effect is helpful for reducing surface drag and yet increases mixing. It should be appreciated that such voltages can be pulsed (e.g., at first harmonic, second harmonic, etc) to alter these effects.

Figure 18:
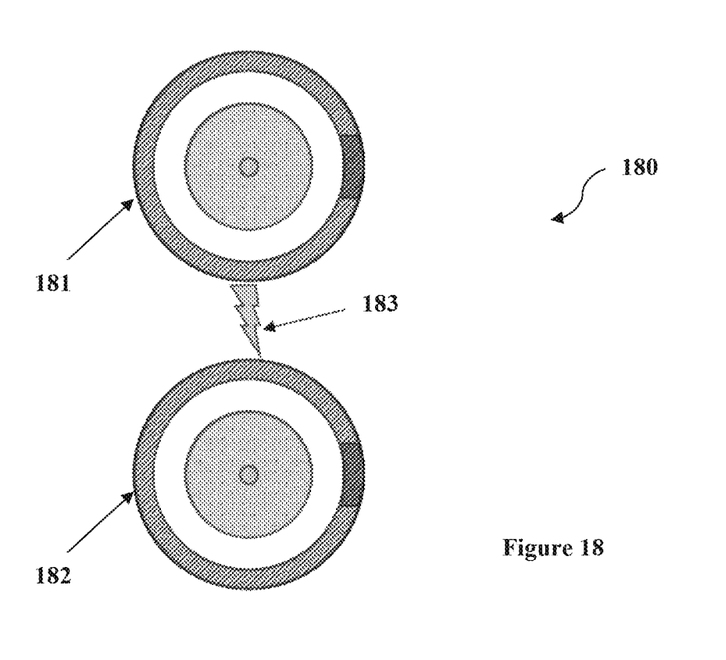
FIG. 18 depicts yet another array of single tube cells of the inventive subject matter.

FIG. 18 depicts single tube cell array 180 with single tube cells 181 and 182, and arc discharge 182. In some embodiments, there is a plasma arc in between the tubes and/or between the tubes and another high voltage electrode for the generation of NO.

FIG. 19 depicts single tube cell 20 further including ultrasonic transducer 191 positioned upstream from tube inlet 192. Micro vortices 193 are also formed in the plasma inside single tube cell 20. Ultrasonic waves increase the plasma energy density by inducing micro-vorticity within the gas stream. The surface features guide the micro vortices into a coherent structured turbulence. The ultrasonic waves are applied at a harmonic of the plasma drive frequency for an amplified resonant coupling effect.

Figure 20:
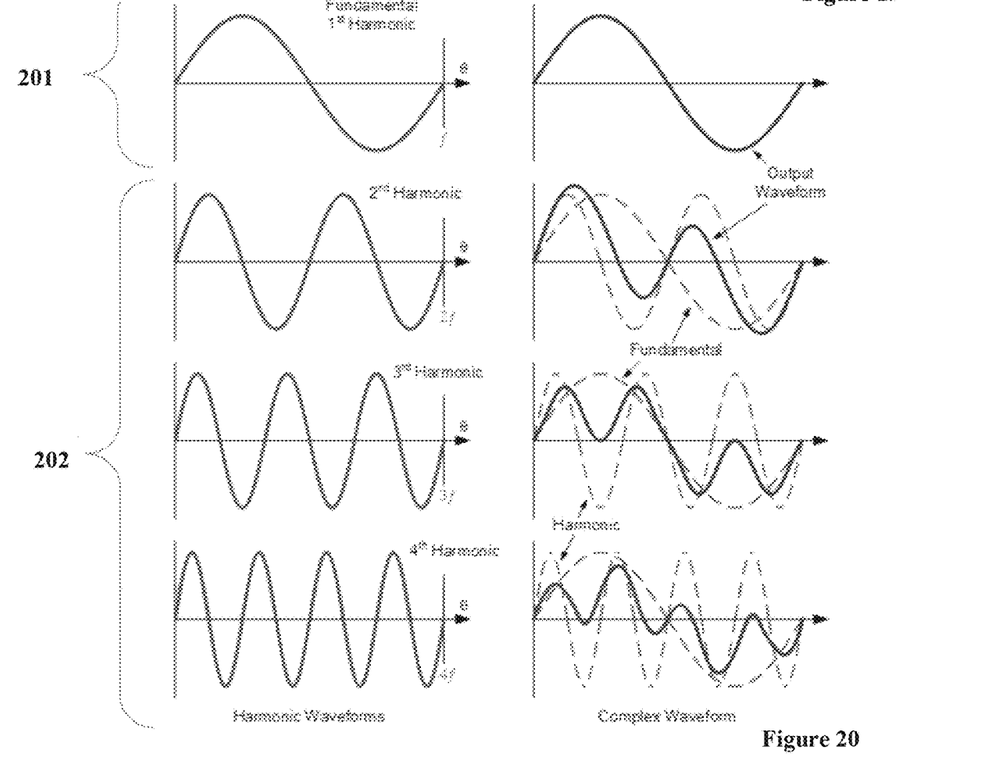
FIG. 20 depicts waveforms produced by the inventive subject matter.

FIG. 20 depicts wave forms 201 generated by plasma driver at resonant frequency (first harmonic), and wave forms 202 generated by ultrasonic transducer at second harmonic, third harmonic, and fourth harmonic frequencies. It should be appreciated the current can also be pulsed at electrodes using these wave profiles.

Figure 21:
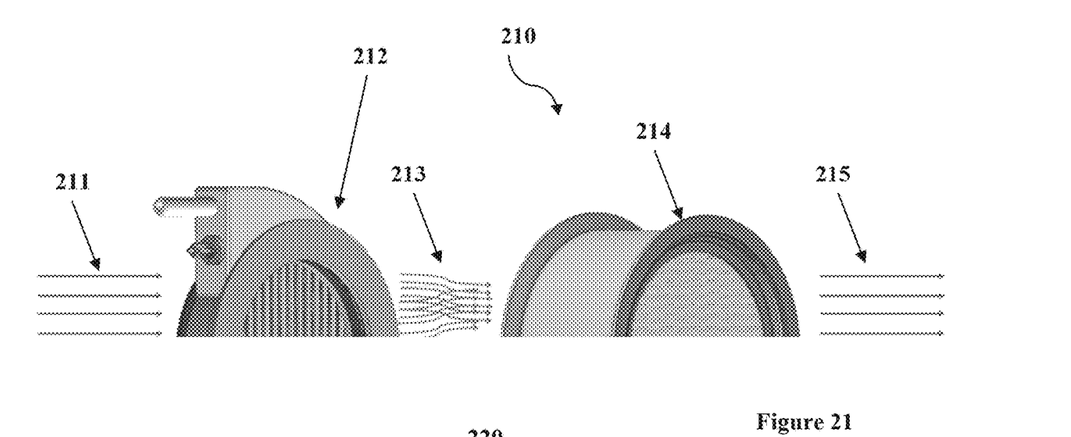
FIG. 21 depicts an assembly including a DBD array of the inventive subject matter.

FIG. 21 depicts assembly 210 having input flow 211 flowing into DBD array 212, mixing flow 213 flowing into catalyst/particulate filter 214, and output flow 215 flowing out. DBD array 212 has tightly packed tube arrays, for example with flow cross section less than the tube diameter of tubes in the DBD array. Mixing flow 213 has high mixing of radicals (e.g., oxidants) generated from treatment system with exhaust steam. Catalyst/particulate filter 214 has resistive surface features and blunted body type geometry. With the High Mixing Tube Configuration of assembly 210, the radicals are mixed with the exhaust stream.

Figure 22:
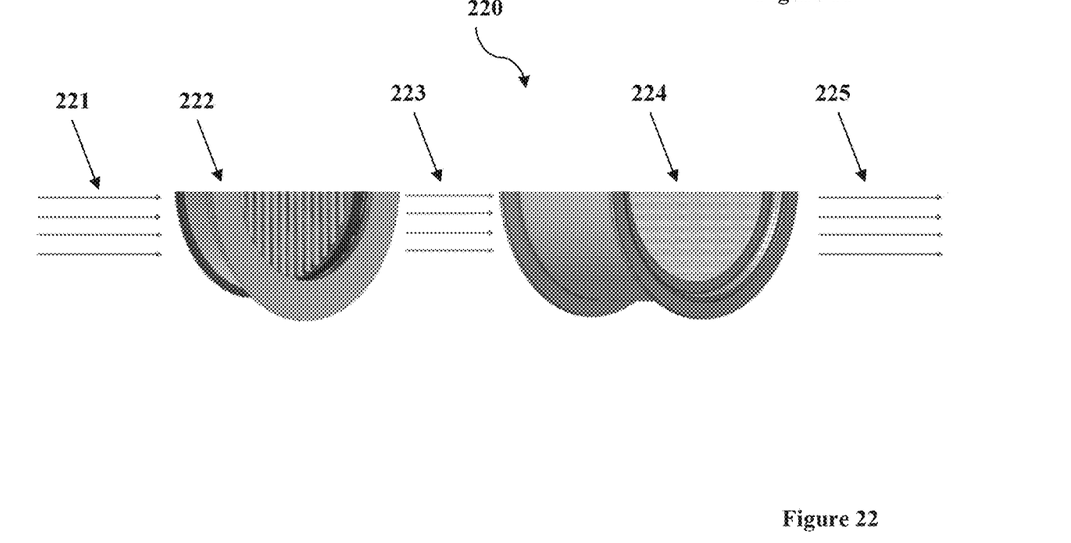
FIG. 22 depicts another assembly including a DBD array of the inventive subject matter.

FIG. 22 depicts assembly 220 having input flow 221 flowing into DBD array 222, mixing flow 223 flowing into catalyst/particulate filter 224, and output flow 225 flowing out. DBD array 222 has loosely packed tube arrays, for example with flow cross section more than the tube diameter of tubes in the DBD array. Mixing flow 223 has low mixing of radicals generated from treatment system with exhaust steam. Catalyst/particulate filter 224 has accelerating surface features and streamlined body type geometry. With the Low Mixing Tube Configuration of assembly 220, the radicals create a jet stream directed to their target catalyst/particulate filter surface with minimal mixing with the exhaust stream.

Figure 23:
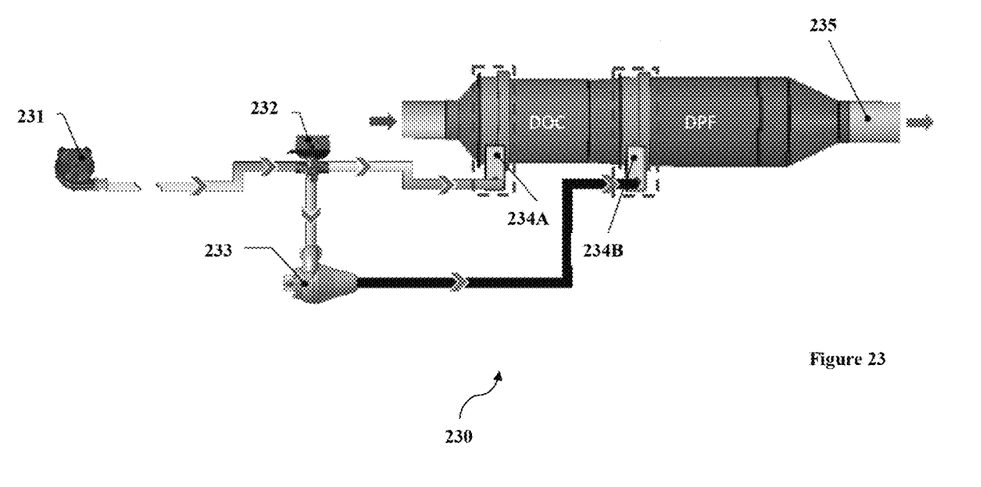
FIG. 23 depicts an yet another assembly including DBD arrays of the inventive subject matter.

FIG. 23 depicts diesel exhaust plasma array treatment system 230, with air pump 231, electric 3-way valve 232, vortex arc discharge 233, DBD tube arrays 234A and 234B, and clean exhaust stream outlet 235. Air pump 231 supplies are to the plasma systems, and can include a blower or turbo. Electric 3-way valve 232 control flow of incoming air to each plasma array. Vortex arc discharge 233 generates nitrogen monoxide (NO). DBD tube arrays 234A and 234B generate Oxygen radicals. DBD tube array 234A is positioned upstream of diesel oxidant catalyst (DOC) and receives an air stream from air pump 231 and an exhaust stream. DBD tube array 234B is positioned downstream of 234A and the DOC, and upstream of a diesel particulate filter (DPF). DBD tube array 234B receives NO rich air and a stream that has been treated by DBD tube array 234A and the DOC, which effectively oxidizes NO to nitrogen dioxide ($NO_2$) and funnels the stream in the DPF. Clean exhaust stream outlet 235 outputs gas from the DPF that is free of carbon monoxide (CO), NO, hydrocarbons (HC), and soot. CO, NO, HC, and soot are effectively oxidized by the radicals supplied by DBD tube arrays 234A and 234B.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for treating a first stream with a first flow path, comprising:
   a first tube comprising:
   a second flow path for a second stream to flow through the first tube and out an outlet,
   an inner electrode within the first tube, and
   an outer electrode having the outlet, wherein an outer surface of the outer electrode comprises surface features that either accelerate or decelerate a stream exiting a second tube and flowing around the outer electrode; and
   a power generator coupled to the inner electrode and the outer electrode to generate a dielectric barrier discharge in the second flow path;
   wherein the first flow path flows around the exterior of the first tube to intersect with a stream exiting the outlet; and
   wherein the first tube has an axis extending the length of the tube, and wherein the first tube is oriented such that the axis is perpendicular to the first flow path.

2. The system of claim 1, wherein the system comprises an array of tubes substantially identical to the first tube, and wherein the first stream flows around at least some of the array of tubes to intersect with the stream exiting the outlet.

3. The system of claim 2, wherein the array of tubes comprises a plurality of rows of tubes.

4. The system of claim 3, wherein each neighboring row of tubes is offset along the first flow path from one another.

5. The system of claim 3, wherein each neighboring row of tubes is offset in at least one of a square 90° configuration, a square 45° configuration, a triangle 30° configuration, and a triangle 45° configuration.

6. The system of claim 3, wherein a distance between at least some of the tubes is optimized to maximize mixing of the stream exiting the outlet and the first stream.

7. The system of claim 3, wherein a distance between at least some of the tubes is optimized to minimize mixing of the stream exiting the outlet and the first stream.

8. The system of claim 3, wherein a distance between at least 3 tubes of the rows of tubes conforms to the golden mean.

9. The system of claim 1, wherein the outer electrode has a cross-sectional area of at least one of a circle, a tear drop, a diamond, or a curved tear drop.

10. The system of claim 9, wherein at least 3 features of the cross-sectional area conform to the golden mean.

11. The system of claim 9, wherein the cross-sectional area of the outer electrode is twisted along a length of the outer electrode to form a spiral.

12. The system of claim 11, wherein at least 3 features of the spiral along the outer electrode conform to the golden mean.

13. The system of claim 1, further comprising a downstream electrode placed downstream from the outlet, wherein voltage is applied to the downstream electrode to entrain flow from the first tube to the downstream electrode.

14. The system of claim 13, wherein power to the downstream electrode is pulsed to alter a flow speed towards the downstream electrode.

15. A system for treating a first stream, comprising:
   a tube, comprising:
   an oxidizing flow path for a second stream to flow through the tube and out an outlet,
   an inner electrode within the tube, and
   an outer electrode having the outlet, wherein a cross-sectional shape of the outer electrode is configured to either maximize or minimize mixing of the second stream and the first stream; and a power generator coupled to the inner electrode and the outer electrode to generate a dielectric barrier discharge in the oxidizing flow path;

wherein the first stream flows around the exterior of the tube to intersect with the second stream exiting the outlet; and wherein the tube has an axis extending the length of the tube, and wherein the tube is oriented such that the axis is perpendicular to the first stream.

16. A first tube for treating a first stream, comprising:

an oxidizing flow path for a second stream to flow through the first tube and out an outlet;

an inner electrode within the first tube;

an outer electrode having the outlet, wherein at least one of (i) a cross-sectional shape of an outer surface of the outer electrode is configured to either maximize or minimize mixing of the second stream and the first stream, or (ii) the outer surface of the outer electrode comprises surface features that either accelerate or decelerate a stream exiting a second tube and flowing around the outer surface of the outer electrode; and a second tube oriented parallel to the first tube;

wherein the first stream flows around the exterior of the first tube and intersects a stream exiting the outlet; and wherein the first tube has an axis extending the length of the tube, and wherein the first tube is oriented such that the axis is perpendicular to the first stream.

\* \* \* \* \*